US012689462B2

(12) United States Patent
Jeong et al.

(10) Patent No.: US 12,689,462 B2
(45) Date of Patent: Jul. 21, 2026

(54) LINK ADAPTATION METHOD AND DEVICE FOR DYNAMIC TIME DIVISION DUPLEX IN WIRELESS COMMUNICATION SYSTEM

(71) Applicants:SAMSUNG ELECTRONICS CO., LTD., Suwon-si (KR); UIF (UNIVERSITY INDUSTRY FOUNDATION), YONSEI UNIVERSITY, Seoul (KR)

(72) Inventors: Youngmin Jeong, Suwon-si (KR); Hyejin Kim, Seoul (KR); Daesik Hong, Seoul (KR); Jeewoong Kang, Suwon-si (KR); Wontae Yu, Suwon-si (KR); Hyunkyu Yu, Suwon-si (KR); Hoon Huh, Suwon-si (KR)

(73) Assignees: SAMSUNG ELECTRONICS CO., LTD., Suwon-si (KR); UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 341 days.

(21) Appl. No.: 18/208,065

(22) Filed: Jun. 9, 2023

(65) Prior Publication Data

US 2023/0327798 A1 Oct. 12, 2023

Related U.S. Application Data

(63) Continuation of application No. PCT/KR2021/018459, filed on Dec. 7, 2021.

(30) Foreign Application Priority Data

Dec. 9, 2020 (KR) ........................ 10-2020-0171635

(51) Int. Cl.
| | |
|---|---|
| *H04L 1/00* | (2006.01) |
| *H04B 17/336* | (2015.01) |
| *H04B 7/06* | (2006.01) |

(52) U.S. Cl.
CPC ......... *H04L 1/0003* (2013.01); *H04B 17/336* (2015.01); *H04B 7/0626* (2013.01)

(58) Field of Classification Search
None
See application file for complete search history.

(56) References Cited

U.S. PATENT DOCUMENTS

| | | | |
|---|---|---|---|
| 8,139,548 B2 | 3/2012 | Park et al. | |
| 9,319,928 B2 | 4/2016 | Bertrand et al. | |

(Continued)

FOREIGN PATENT DOCUMENTS

| | | | | |
|---|---|---|---|---|
| EP | 3277039 A1 * | 1/2018 | ......... | H04L 27/2602 |
| EP | 2901785 B1 | 2/2019 | | |

(Continued)

OTHER PUBLICATIONS

Toril et al., "Self-Optimization Algorithm for Outer Loop Link Adaptation in LTE," IEEE Communications Letters, vol. 19, No. 11, Nov. 2015, Total 4 pages.

(Continued)

*Primary Examiner* — Anh Vu H Ly
(74) *Attorney, Agent, or Firm* — Sughrue Mion, PLLC

(57) ABSTRACT

The present disclosure relates to a 5$^{th}$ generation (5G) or pre-5G communication system for supporting higher data transmission rates than 4$^{th}$ generation (4G) communication systems such as long term evolution (LTE). A method performed by a first base station in a wireless communication system includes: identifying a first signal-to-interference-noise ratio (SINR), based on channel state information received from a terminal; identifying a modulation and (Continued)

coding scheme (MCS), based on the first SINR and information on a link direction of a second base station; and transmitting information indicating the MCS to the terminal.

6 Claims, 8 Drawing Sheets

(56)                    References Cited

U.S. PATENT DOCUMENTS

| | | | |
|---|---|---|---|
| 9,414,241 | B2 | 8/2016 | Ge et al. |
| 10,015,691 | B2 | 7/2018 | Damnjanovic et al. |
| 10,182,376 | B2 | 1/2019 | Zhu et al. |
| 10,243,637 | B2 | 3/2019 | Gutierrez et al. |
| 10,263,730 | B2 | 4/2019 | Pitakdumrongkija et al. |
| 10,764,016 | B2 | 9/2020 | Kim et al. |
| 11,272,429 | B2 | 3/2022 | Islam et al. |
| 12,041,476 | B2 * | 7/2024 | Ying ................ H04W 74/0866 |
| 2009/0201838 | A1 | 8/2009 | Zhang et al. |
| 2011/0081865 | A1 * | 4/2011 | Xiao .......................... H04L 1/06 |
| | | | 455/63.1 |
| 2013/0188500 | A1 | 7/2013 | He et al. |
| 2016/0309476 | A1 * | 10/2016 | Madan .............. H04W 28/0236 |
| 2017/0223671 | A1 | 8/2017 | He et al. |
| 2017/0257204 | A1 | 9/2017 | Shi et al. |
| 2017/0289917 | A1 * | 10/2017 | Visotsky ............... H04W 72/52 |
| 2018/0035486 | A1 | 2/2018 | Mendo Mateo et al. |
| 2020/0036490 | A1 * | 1/2020 | Qian ...................... H04L 5/0075 |
| 2022/0104057 | A1 * | 3/2022 | Abedini ................ H04W 28/16 |

FOREIGN PATENT DOCUMENTS

| | | |
|---|---|---|
| JP | 2017-539184 A | 12/2017 |
| KR | 10-0951382 B1 | 4/2010 |
| KR | 10-2011-0053920 A | 5/2011 |
| KR | 10-2011-0078317 A | 7/2011 |
| KR | 10-2015-0062592 A | 6/2015 |
| KR | 10-2016-0018837 A | 2/2016 |
| KR | 10-2016-0028167 A | 3/2016 |
| KR | 10-2016-0119816 A | 10/2016 |
| KR | 10-2017-0056714 A | 5/2017 |
| KR | 10-2017-0070046 A | 6/2017 |
| KR | 10-2019-0106965 A | 9/2019 |
| KR | 10-2019-0116309 A | 10/2019 |
| WO | 2016/101087 A1 | 6/2016 |
| WO | 2020 032842 A1 | 2/2020 |

OTHER PUBLICATIONS

Cavalcante et al., "System-Level Analysis of Outer Loop Link Adaptation on Mobile WiMAX Systems," The 7th International Telecommunications Symposium (ITS 2010), 2010, Total 5 pages.

International Search Report dated Mar. 24, 2022, issued by the International Searching Authority in International Application No. PCT/KR2021/018459 (PCT/ISA/210).

Written Opinion dated Mar. 24, 2022, issued by the International Searching Authority in International Application No. PCT/KR2021/018459 (PCT/ISA/237).

Communication dated May 19, 2025 issued by the Korean Intellectual Property Office in Korean Patent Application No. 10-2020-0171635.

Communication dated Jan. 14, 2026 issued by the Korean Ministry of Intellectual Property in Korean Patent Application No. 10-2020-0171635.

* cited by examiner

LINK ADAPTATION METHOD AND DEVICE FOR DYNAMIC TIME DIVISION DUPLEX IN WIRELESS COMMUNICATION SYSTEM

CROSS-REFERENCE TO RELATED APPLICATIONS

This application is a bypass continuation application of International Patent Application No. PCT/KR2021/018459, filed on Dec. 7, 2021, which is based on and claims priority to Korean Patent Application No. 10-2020-0171635, filed on Dec. 9, 2020, in the Korean Intellectual Property Office, the disclosures of which are incorporated by reference herein in their entireties.

BACKGROUND

1. Field

The disclosure relates generally to wireless communication systems and, more particularly, to a link adaptation method and device for dynamic time division duplex (TDD) in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency bands so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Since the strength of the interference power measured in a serving cell varies in a dynamic time division duplex (TDD) environment depending on a link direction of a neighboring cell, a base station in the serving cell needs to perform link adaption of the serving cell according to the link direction of the neighboring cell.

SUMMARY

Provided are a method and device for determining a modulation and coding scheme (MCS), based on a link direction of a neighboring cell in a wireless communication system.

According to an aspect of the disclosure, a method performed by a first base station in a wireless communication system, includes: identifying a first signal-to-interference-noise ratio (SINR), based on channel state information received from a terminal; identifying a modulation and coding scheme (MCS), based on the first SINR and information on a link direction of a second base station; and transmitting information indicating the MCS to the terminal.

The information on the link direction of the second base station may include information on a first link direction of the second base station in a first slot and information on a second link direction of the second base station in a second slot.

The identifying of the first SINR may include transmitting a downlink reference signal to the terminal, and the channel state information is based on the downlink reference signal.

The method may further include: transmitting downlink data to the terminal in the first slot; receiving a response to the downlink data from the terminal; and determining an offset factor, based on the response from the terminal and the link direction of the second base station in the first slot.

The method may further include: identifying a second SINR from the first SINR, based on the offset factor and the link direction of the second base station in the second slot; and identifying the MCS, based on the second SINR.

According to an aspect of the disclosure, a method performed by a first base station in a wireless communication system, includes: identifying a first signal-to-interference-noise ratio (SINR), based on an uplink reference signal received from a terminal; identifying a modulation and coding scheme (MCS), based on the first SINR and information on a link direction of a second base station; and transmitting information indicating the MCS to the terminal.

The information on the link direction of the second base station may include information on a first link direction of the second base station in a first slot and information on a second link direction of the second base station in a second slot.

The method may further include: receiving uplink data from the terminal in the first slot; decoding the uplink data; and determining an offset factor, based on the decoding of the uplink data and the link direction of the second base station in the first slot.

The method may further include: identifying a second SINR from the first SINR, based on the offset factor and the link direction of the second base station in the second slot; and identifying the MCS, based on the second SINR.

The uplink reference signal may be a sounding reference signal (SRS).

According to an aspect of the disclosure, a first base station in a wireless communication system, includes: at least one transceiver; and at least one processor operatively connected to the at least one transceiver, wherein the at least one processor is configured to: identify a first signal-to-interference-noise ratio (SINR), based on channel state information received from a terminal; identify a modulation and coding scheme (MCS), based on the first SINR and information on a link direction of a second base station; and transmit information indicating the MCS to the terminal.

The information on the link direction of the second base station may include information on a first link direction of the second base station in a first slot and information on a second link direction of the second base station in a second slot.

The at least one processor may be further configured to transmit a downlink reference signal to the terminal, and the channel state information is based on the downlink reference signal.

The at least one processor may be further configured to: transmit downlink data to the terminal in the first slot; receive a response to the downlink data from the terminal; and determine an offset factor, based on the response from the terminal and the link direction of the second base station in the first slot.

The at least one processor may be further configured to: identify a second SINR from the first SINR, based on the offset factor and the link direction of the second base station in the second slot; and identify the MCS, based on the second SINR. A method and device according to one or more embodiments of the disclosure may determine an MCS, based on a link direction of a neighboring cell in a wireless communication system, thereby increasing a data transmission rate.

Advantageous effects obtainable from the disclosure are not limited to the above mentioned effects, and other effects which are not mentioned may be readily understood, through the following descriptions, by those skilled in the art to which the disclosure pertains.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, various embodiments will be described using terms employed in some communication standards (e.g., long term evolution (LTE) and new radio (NR) defined by the 3rd generation partnership project (3GPP)), but they are only for the sake of illustration. The embodiments of the disclosure may also be easily applied to other communication systems through modifications.

Hereinafter, the disclosure relates to a link adaptation method and device for dynamic time division duplex (TDD) in a wireless communication system. Specifically, considering that the strength of interference power measured at a base station in a dynamic TDD system varies according to the link direction of a neighboring base station, the disclosure will give a description of a technique using different methods for link adaptation according to the link direction of a neighboring base station.

Figure 1:
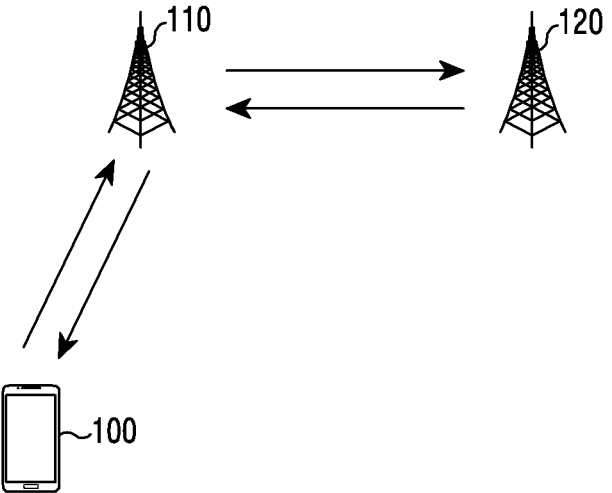
FIG. 1 illustrates an example of a wireless communication system according to various embodiments of the disclosure.

FIG. 1 illustrates an example of a wireless communication system according to various embodiments of the disclosure. FIG. 1 illustrates a terminal 100, a base station 110, and a base station 120 as a part of nodes using a radio channel in a wireless communication system.

The terminal 100 is a device used by a user and may perform communication via a radio channel formed with the base stations 110 and 120, that is, an access network. In some cases, the terminal 100 may be operated without user involvement. That is, the terminal 100 is a device that performs machine type communication (MTC) and need not be carried by a user. The terminal 100 may be referred to as a "terminal", "user equipment (UE)", "mobile station (MS)", "subscriber station", "customer premises equipment (CPE)", "remote terminal", "wireless terminal", "vehicle terminal", "user device" or other terms having a technical meaning equivalent thereto.

The base station 110 or 120 is a network infrastructure that provides wireless access. The base station 110 or 120 has coverage defined as a certain geographical area, based on a distance over which signals may be transmitted. The term "coverage" used hereinafter may indicate a service coverage area in the base station 110 or 120. The base station 110 or 120 may cover one cell or multiple cells. Here, a plurality of cells may be distinguished by the frequency supported thereby and the area of the sector covered thereby.

The base station 110 or 120 may be referred to as, in addition to the base station, an "access point (AP)", "eNodeB (eNB)", "5th generation node", "5G NodeB", "next generation node B (gNB)", "wireless point", "transmission/reception point (TRP)", "distributed unit (DU)", "radio unit (RU)", "remote radio head (RRH)" or any other term having a technical meaning equivalent thereto.

In a conventional communication system in which the cell radius of a base station is relatively large, each base station has been installed such that each base station includes the functions of a digital processing unit (DU) and a radio frequency processing unit (RU). However, in 4th generation (4G) and/or later communication systems, high frequency bands have been used, and as the cell radius of a base station has decreased, the number of base stations to cover a specific area has increased. As a result, operators' burden on installation costs for installing increased base stations has increased. To minimize the installation cost of base stations, a structure in which the DU and RU of a base station are separated, one or more RUs are connected to one DU via a wired network, and one or more geographically distributed RUs are deployed to cover a specific area has been proposed. The base stations 110 and 120 may be configured as RUs, and the base station 110 and the base station 120 may exchange scheduling information via a fronthaul with a DU.

Figure 2:
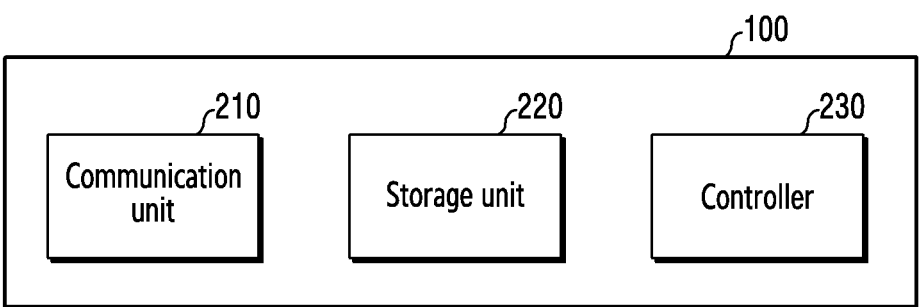
FIG. 2 illustrates components of a terminal according to various embodiments of the disclosure.

FIG. 2 illustrates components of a terminal according to various embodiments of the disclosure. The components illustrated in FIG. 2 may be understood as the components of the terminal 100 in FIG. 1. Terms such as " . . . unit" and " . . . group" used below refer to a unit that processes at least one function or operation, which may be implemented by hardware, software, or a combination of hardware and software.

Referring to FIG. 2, the terminal 100 may include a communication unit 210, a storage unit 220, and a controller 230.

The communication unit 210 may perform functions for transmitting and receiving signals via a wireless channel. For example, the communication unit 210 may perform a conversion function between a baseband signal and a bit stream according to the physical layer standard of a system. For example, when transmitting data, the communication unit 210 may produce complex symbols by encoding and modulating a transmission bit stream. In addition, when receiving data, the communication unit 210 may restore the baseband signal to a reception bit stream via demodulation and decoding. In addition, the communication unit 210 may up-convert the baseband signal into a radio frequency (RF) band signal and then transmit the signal via an antenna, and down-convert the RF band signal received via the antenna into a baseband signal. To this end, the communication unit 210 may include a transmission filter, a reception filter, an amplifier, a mixer, an oscillator, a digital-to-analog converter (DAC), and an analog-to-digital converter (ADC).

In addition, the communication unit 210 may include a plurality of transmission/reception paths. Furthermore, the communication unit 210 may include an antenna unit. The communication unit 210 may include at least one antenna array formed of a plurality of antenna elements. In terms of hardware, the communication unit 210 may include digital and analog circuits (e.g., a radio frequency integrated circuit (RFIC)). Here, the digital circuit and the analog circuit may be implemented in a single package. In addition, the communication unit 210 may include a plurality of RF chains. The communication unit 210 may perform beamforming. The communication unit 210 may apply a beamforming weight to a signal to give a signal to be transmitted/received a directionality which is according to configuration of the controller 230.

In addition, the communication unit 210 may transmit and receive signals. To this end, the communication unit 210 may include at least one transceiver. The communication unit 210 may receive a downlink signal. The downlink signal may include a synchronization signal, a reference signal, a configuration message, control information, or downlink data. In addition, the communication unit 210 may transmit an uplink signal. The uplink signal may include a random access related signal (e.g., random access preamble (RAP), message 3 (Msg3)), a reference signal, a power headroom report (PHR), uplink data, and the like.

In addition, the communication unit 210 may include different communication modules to process signals of different frequency bands. Furthermore, the communication unit 210 may include a plurality of communication modules to support a plurality of different wireless access technologies. For example, the different radio access technologies may include Bluetooth low energy (BLE), wireless fidelity (Wi-Fi), WiFi gigabyte (WiGig), a cellular network (e.g., long-term evolution (LTE), new radio (NR)), etc. In addition, the different frequency bands may include a super high frequency (SHF) (e.g., 2.5 GHz, 5 GHz) band and a millimeter wave (e.g., 38 GHz, 60 GHz, etc.) band. In addition, the communication unit 210 may use the same radio access technology on different frequency bands (e.g., unlicensed band for licensed assisted access (LAA), citizens broadband radio service (CBRS) (e.g., 3.5 GHz)).

The communication unit 210 may transmit and receive signals as described above. Accordingly, all or part of the communication unit 210 may be referred to as a "transmitter", a "receiver" or a "transceiver". In addition, in the following description, transmission and reception performed via a radio channel may be used as a meaning including processing as described above performed by the communication unit 210.

The storage unit 220 may store data such as a basic program for operation of the terminal 100, an application program, and configuration information. The storage unit 220 may include a volatile memory, a non-volatile memory, or a combination of volatile and non-volatile memories. In addition, the storage unit 220 may provide stored data according to the request from the controller 230.

The controller 230 may control overall operations of the terminal 100. For example, the controller 230 may transmit and receive signals through the communication unit 210. In addition, the controller 230 may write and read data in the storage unit 220. In addition, the controller 230 may perform protocol stack functions according to applicable communication standards. To this end, the controller 230 may include at least one processor. The controller 230 may include at least one processor or microprocessor or may be a part of the processor. In addition, a part of the communication unit 210 and the controller 230 may be referred to as a communication processor (CP). The controller 230 may include various modules for performing communication. The controller 230 may perform control such that the terminal 100 performs operations according to embodiments to be described later.

The components of the terminal 100 illustrated in FIG. 2 are only an example, and terminal performing various embodiments of the disclosure are not limited to the components illustrated in FIG. 2. That is, according to various embodiments, some components may be added, omitted, or changed.

Figure 3:
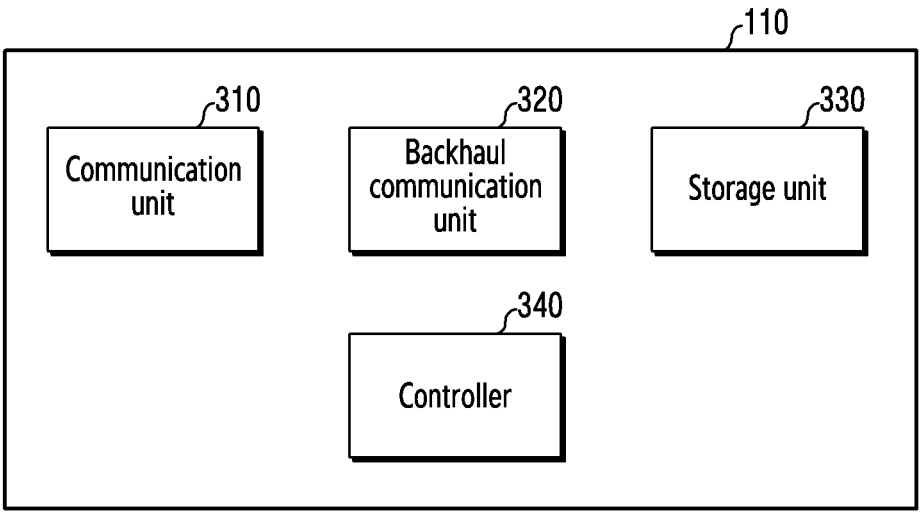
FIG. 3 illustrates components of a base station according to various embodiments of the disclosure.

FIG. 3 illustrates components of a base station according to various embodiments of the disclosure. The components illustrated in FIG. 2 may be understood as the components of the base station 110 in FIG. 1. Terms such as " . . . unit" and " . . . group" used below refer to a unit that processes at least one function or operation, which may be implemented by hardware, software, or a combination of hardware and software.

Referring to FIG. 3, the base station 110 may include a communication unit 310, a backhaul communication unit 320, a storage unit 330, and a controller 340.

The communication unit 310 may perform functions for transmitting and receiving signals via a wireless channel. For example, the communication unit 310 may perform a conversion function between a baseband signal and a bit stream according to the physical layer standard of a system. For example, when transmitting data, the communication unit 310 may produce complex symbols by encoding and modulating a transmission bit stream. In addition, when receiving data, the communication unit 310 may restore the baseband signal to a reception bit stream via demodulation and decoding. In addition, the communication unit 310 may up-convert a baseband signal into a radio frequency (RF) band signal and then transmit the signal via an antenna, and down-convert the RF band signal received via the antenna into a baseband signal. To this end, the communication unit 310 may include a transmission filter, a reception filter, an amplifier, a mixer, an oscillator, a digital-to-analog converter (DAC), an analog-to-digital converter (ADC), and the like.

In addition, the communication unit 310 may include a plurality of transmission/reception paths. Furthermore, the communication unit 310 may include at least one antenna array formed of a plurality of antenna elements. In terms of hardware, the communication unit 310 may include digital and analog circuits (e.g., a radio frequency integrated circuit (RFIC)), and the analog unit may include a plurality of sub-units according to operating power, operating frequency, etc.

The communication unit 310 may transmit and receive signals. To this end, the communication unit 310 may include at least one transceiver. For example, the communication unit 310 may transmit a synchronization signal, a reference signal, system information, a configuration message, control information, or data. In addition, the communication unit 310 may perform beamforming.

The communication unit 310 may transmit and receive signals as described above. Accordingly, all or part of the communication unit 310 may be referred to as a "transmitter", a "receiver" or a "transceiver". In addition, in the following description, transmission and reception performed via a radio channel may be used as a meaning including processing as described above performed by the communication unit 310.

The backhaul communication unit 320 provides an interface for communicating with other nodes in a network. That is, the backhaul communication unit 320 may convert a bit stream transmitted to other nodes, for example, other access nodes, other base stations, upper nodes, core networks, etc. into a physical signal, and convert a physical signal received from other nodes into a bit stream.

The storage unit 330 may store data such as a basic program for operation of the base station 110, an application program, and configuration information. The storage unit 330 may include a memory. The storage unit 330 may include a volatile memory, a non-volatile memory, or a combination of volatile and non-volatile memories. In addition, the storage unit 330 may provide stored data according to a request from the controller 340.

The controller 340 may control overall operations of the base station 110. For example, the controller 340 may transmit and receive signals through the communication unit 310 or the backhaul communication unit 320. In addition, the controller 340 may perform protocol stack functions according to applicable communication standards. To this end, the controller 340 may include at least one processor. The controller 340 may perform control such that the base station 110 performs operations according to embodiments to be described later.

The components of the base station 110 illustrated in FIG. 3 are only an example, base station performing various embodiments of the disclosure are not limited to the components illustrated in FIG. 3. That is, according to various embodiments, some components may be added, omitted, or changed.

Figure 4:
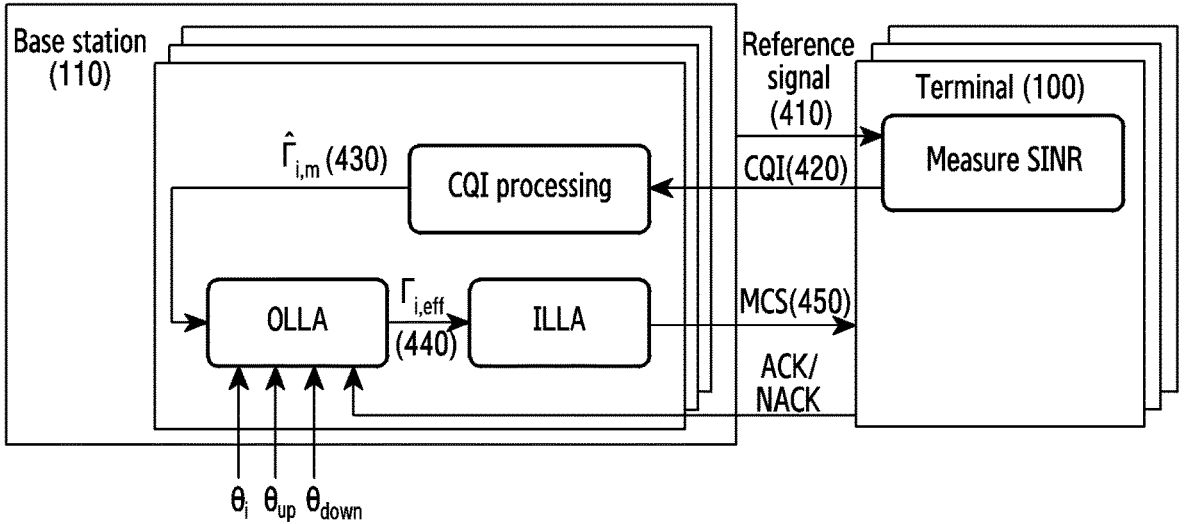
FIG. 4 illustrates a signal flow for link adaptation in downlink according to an embodiment of the disclosure.

FIG. 4 illustrates a signal flow for link adaptation in downlink according to an embodiment of the disclosure. In FIG. 4, a link adaptation scheme in case all cells use downlink in an existing time division duplex (TDD) system is described.

Referring to FIG. 4, in operation 410, the base station 110 may transmit a downlink reference signal to the terminal 100. In operation 420, the base station 110 may receive channel quality information (e.g., channel quality indicator (CQI)) from the terminal 100. In operation 430, the base station 110 may identify downlink SINR ($\hat{\Gamma}_{i,m}$), based on the received channel quality. In operation 440, the base station 110 may obtain a compensated downlink SINR ($\Gamma_{i,eff}$), based on the response to the downlink data. Specifically, the base station 110 may transmit downlink data to the terminal 100 in slot ($t_1$). The base station 110 may receive a response to transmitted downlink data from the terminal 100. The response to the downlink data may be ACK or NACK. In this case, the base station 110 may update an offset factor $\theta_i$, based on the response to the downlink data. Here, $\theta_i$ may be used to compensate for downlink SINR ($\hat{\Gamma}_{i,m}$) in the next downlink scheduling. For example, the base station 110 may add $\theta_{up}$ to $\theta_i$ when the response to the downlink data is ACK, and subtract $\theta_{down}$ from $\theta_i$ when the response to the downlink data is NACK. Expressing this mathematically, it is as follows:

$$\begin{cases} \theta_i = \theta_i + \theta_{up} \text{ when response is } ACK & \text{[Equation 1]} \\ \theta_i = \theta_i - \theta_{down} \text{ when response is } NACK \end{cases}$$

Here, $\theta_{up}$ and $\theta_{down}$ down may be predefined values for link adaptation, based on a response to downlink data.

The base station 110 may obtain a compensated downlink SINR ($\Gamma_{i,eff}$) by adding an offset factor $\theta_i$ to the identified downlink SINR ($\hat{\Gamma}_{i,m}$). Expressing this mathematically, it is as follows:

$$\Gamma_{i,eff} = \hat{\Gamma}_{i,m} + \theta_i \qquad \text{[Equation 2]}$$

This process may be referred to as outer loop link adaptation (OLLA) or outer loop rate control (OLRC).

In operation 450, the base station 110 may transmit a modulation and coding scheme (MCS) to the terminal 100. The base station 110 may identify the MCS, based on the obtained SINR ($\Gamma_{i,eff}$). The MCS may be applied in a slot ($t_2$) to which the next downlink data is to be transmitted. This process may be referred to as inner loop link adaptation (ILLA) or closed loop rate control (CLRC). The base station 110 may transmit the identified MCS to the terminal 100.

Figure 5:
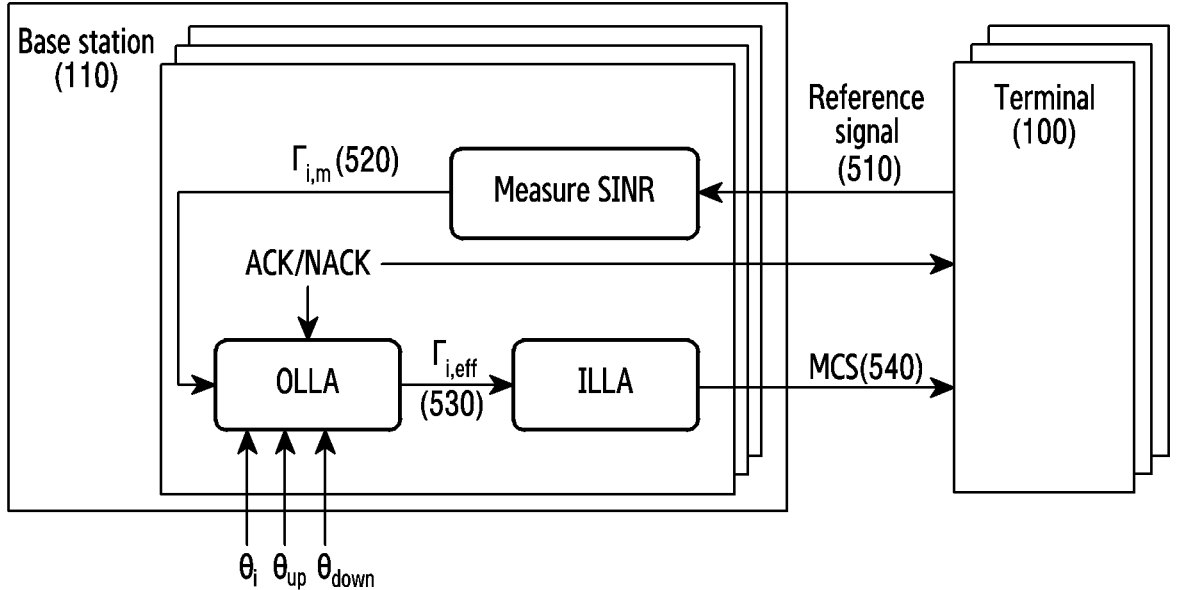
FIG. 5 illustrates a signal flow for link adaptation in uplink according to an embodiment of the disclosure.

FIG. 5 illustrates a signal flow for link adaptation in uplink according to an embodiment of the disclosure. In FIG. 5, a link adaptation scheme in case all cells use uplink in an existing time division duplex (TDD) system is described.

Referring to FIG. 5, in operation 510, the base station 110 may receive an uplink reference signal (e.g., sounding reference signal (SRS)) from the terminal 100. In operation 520, the base station 110 may identify uplink SINR ($\Gamma_{i,m}$), based on the received uplink reference signal. In operation 530, the base station 110 may obtain a compensated uplink SINR ($\Gamma_{i,eff}$), based on the response to the uplink data.

Specifically, the base station 110 may receive uplink data from the terminal 100 in slot ($t_3$). The base station 110 may update an offset factor $\theta_i$, based on whether the received uplink data has been successfully decoded (i.e., whether the response to be transmitted to the terminal 100 is ACK or NACK). Here, $\theta_i$ may be used to compensate for uplink SINR ($\Gamma_{i,m}$), in the next uplink scheduling. For example, the base station 110 may add $\theta_{up}$ to $\theta_i$ when the response to the uplink data is ACK, and subtract $\theta_{down}$ from $\theta_i$ when the response to the uplink data is NACK. Expressing this mathematically, it is as follows:

$$\begin{cases} \theta_i = \theta_i + \theta_{up} \text{ when response is } ACK \\ \theta_i = \theta_i - \theta_{down} \text{ when response is } NACK \end{cases} \qquad \text{[Equation 3]}$$

The base station 110 may obtain a compensated uplink SINR ($\Gamma_{i,eff}$) by adding an offset factor $\theta_i$ to the identified uplink SINR ($\Gamma_{i,m}$). Expressing this mathematically, it is as follows:

$$\Gamma_{i,eff} = \Gamma_{i,m} + \theta_i \qquad \text{[Equation 4]}$$

This process may be referred to as outer loop link adaptation (OLLA) or outer loop rate control (OLRC).

In operation 540, the base station 110 may transmit a modulation and coding scheme (MCS) to the terminal 100. The base station 110 may identify the MCS, based on the obtained SINR ($\Gamma_{i,eff}$). The MCS may be applied in a slot ($t_4$) to which the next uplink data is to be transmitted. This process may be referred to as inner loop link adaptation (ILLA) or closed loop rate control (CLRC). The base station 110 may transmit the identified MCS to the terminal 100.

Referring to FIGS. 4 and 5 described above, in an existing time division duplex (TDD) system, all cells simultaneously use uplink or downlink. Since the terminal is always interfered with by the downlink signal transmitted from the base station in the neighboring cell, the change in signal-to-interference-noise ratio (SINR), which is reception performance, will not be large. In addition, since the base station is always interfered with by the uplink signals transmitted from terminals in neighboring cells, the change in SINR, which is reception performance, will not be large. Therefore, the link performance may be improved when the link adaptation scheme is applied separately to a case in which all cells use uplink and a case in which all cells use downlink.

However, the disclosure relates to a link adaptation technique in a dynamic TDD environment in which uplink and downlink are dynamically allocated for each cell according to traffic conditions in a wireless communication system. In the dynamic TDD system, since link directions are adjusted in units of slots to satisfy traffic requirements for each cell, the link directions may be different for each cell. Accordingly, a terminal may be interfered with by a signal transmitted from a terminal in a neighboring cell. For example, when the link direction of the neighboring cell is uplink, the terminal is affected by interference caused by the uplink signal transmitted from the terminal of the neighboring cell. In addition, a base station may be interfered with by a signal transmitted from a base station in a neighboring cell. For example, when a link direction of the neighboring cell is downlink, the base station is affected by interference caused by the downlink signal transmitted from the base station in the neighboring cell. That is, according to a link direction of a neighboring cell, a terminal or a base station may be interfered with by a signal transmitted from a terminal in the neighboring cell or may also be interfered with by a signal transmitted from a base station in the neighboring cell. In this case, since the power intensity of the signal transmitted from the base station and the power intensity of the signal transmitted from the terminal are different, the strength of the interference power experienced by the terminal or the base station varies depending on the link direction of the neighboring cell. Accordingly, the reception performance, SINR, also varies depending on the link direction of the neighboring cell. As a result, to achieve a high data transmission rate for a terminal or a base station despite a change in SINR, a link adaptation method needs to be changed according to a link direction of a neighboring cell.

Figure 6:
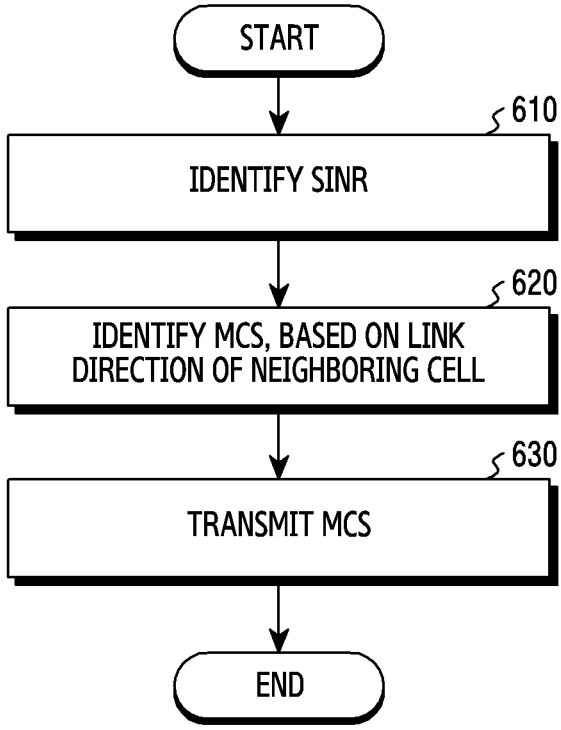
FIG. 6 illustrates an operation flow of a base station for link adaptation according to an embodiment of the disclosure.

FIG. 6 illustrates an operation flow of a base station for link adaptation according to an embodiment of the disclosure. In FIG. 6, the operation flow of the base station for link adaptation will be described separately for downlink data transmission and uplink data reception.

First, a link adaptation operation for downlink data transmission of a base station will be described. Referring to FIG. 6, in operation 610, the base station 110 may identify a downlink signal-to-interference-plus-noise ratio (SINR $\hat{\Gamma}_{i,m}$).

The base station 110 may transmit a downlink reference signal to the terminal 100. For example, the downlink reference signal may include a channel state information-reference signal (CSI-RS), channel state information-interference measurement (CSI-IM), or a combination thereof. The base station 110 may receive, from the terminal 100, channel state information (CSI) determined based on the downlink reference signal received by the terminal 100. For example, the channel state information may include a rank indicator (RI), a precoding matrix indicator (PMI), a channel quality indicator (CQI), a layer indicator (LI), an SS/PBCH block resource indicator (SSBRI), a CSI resource indicator (CRI), an L1 layer 1 reference signal received power (RSRP), or a combination thereof. The base station 110 may identify the downlink SINR ($\hat{\Gamma}_{i,m}$), based on the received channel state information (e.g., a CQI).

In operation 620, the base station 110 may identify a modulation and coding scheme (MCS) for downlink data transmission. The base station 110 may transmit downlink data to the terminal 100. The base station 110 may receive a response to the transmitted downlink data from the terminal 100. The response to the downlink data may be an acknowledgment (ACK) or a negative acknowledgment (NACK). The base station 110 may compensate the identified downlink SINR ($\hat{\Gamma}_{i,m}$), based on the link direction of the neighboring base station 120 and the response to the received downlink data. This process may be referred to as outer loop link adaptation (OLLA) or outer loop rate control (OLRC).

Specifically, the base station 110 may update an offset factor $$\theta_i^D \text{ or } \theta_i^U,$$

based on the link direction of the neighboring base station 120 in the slot ($t_1$) in which the downlink data is transmitted, and the response to the downlink data. Here, $$\theta_i^D$$

may be used to compensate for the downlink SINR ($\hat{\Gamma}_{i,m}$) when the link direction of the neighboring base station 120 is downlink in the next downlink scheduling, and $$\theta_i^U$$

may be used to compensate for downlink SINR ($\hat{\Gamma}_{i,m}$) when the link direction of the neighboring base station 120 is uplink in the next downlink scheduling.

For example, in case that the link direction of the neighboring base station 120 is downlink in the slot ($t_1$) in which downlink data is transmitted, the base station 110 may add $\theta_{up}$ to $$\theta_i^D$$

when the response to the downlink data is ACK, and may subtract $\theta_{down}$ from $$\theta_i^D$$

when the response to the downlink data is NACK. Expressing this mathematically, it is as follows:

$$\begin{cases} \theta_i^D = \theta_i^D + \theta_{up} \text{ when response is } ACK \\ \theta_i^D = \theta_i^D - \theta_{down} \text{ when response is } NACK \end{cases} \quad \text{[Equation 5]}$$

For example, in case that the link direction of the neighboring base station 120 is uplink in the slot ($t_1$) in which downlink data is transmitted, the base station 110 may add $\theta_{up}$ to $$\theta_i^U$$

when the response to the downlink data is ACK, and may subtract $\theta_{down}$ from $$\theta_i^U$$

when the response to the downlink data is NACK. Expressing this mathematically, it is as follows:

$$\begin{cases} \theta_i^U = \theta_i^U + \theta_{up} \text{ when response is } ACK \\ \theta_i^U = \theta_i^U - \theta_{down} \text{ when response is } NACK \end{cases} \quad \text{[Equation 6]}$$

Here, $\theta_{up}$ and $\theta_{down}$ down may be predefined values for link adaptation, based on a response to downlink data.

The base station 110 may obtain a compensated downlink SINR ($\Gamma_{i,eff}$), based on the link direction of the neighboring base station 120 in the slot ($t_2$) in which the next downlink data is to be transmitted. When the link direction of the neighboring base station 120 is uplink in slot ($t_2$), the base station 110 may add the offset factor $$\theta_i^U$$

to the downlink SINR ($\hat{\Gamma}_{i,m}$) to obtain a compensated downlink SINR ($\Gamma_{i,eff}$). When the link direction of the neighboring base station 120 is downlink in slot ($t_2$), the base station 110 may add the offset factor $$\theta_i^D$$

to the downlink SINR ($\hat{\Gamma}_{i,m}$) to obtain a compensated downlink SINR ($\Gamma_{i,eff}$). Expressing this mathematically, it is as follows:

$$\begin{cases} \Gamma_{i,eff} = \hat{\Gamma}_{i,m} + \theta_i^U \text{ in case of uplink in slot } (t2) \\ \Gamma_{i,eff} = \hat{\Gamma}_{i,m} - \theta_i^D \text{ in case of downlink in slot } (t2) \end{cases} \quad \text{[Equation 7]}$$

The base station 110 may identify an MCS for downlink data transmission, based on the obtained SINR ($\Gamma_{i,eff}$). This may be referred to as inner loop link adaptation (ILLA) or closed loop rate control (CLRC).

In operation 630, the base station 110 may transmit the identified MCS to a terminal. The base station 110 may transmit the identified MCS to the terminal on a physical downlink control channel (PDCCH) by using downlink control information (DCI) format 1_0 or 1_1. The MCS may be applied in a slot ($t_2$) in which the next downlink data is to be transmitted.

Next, a link adaptation operation for uplink data transmission of a base station will be described. Referring to FIG. 6, in operation 610, the base station 110 may identify a uplink signal-to-interference-plus-noise ratio (SINR,$\Gamma_{i,m}$). The base station 110 may receive an uplink reference signal from the terminal 100. For example, the uplink reference signal may be a sounding reference signal (SRS). The base station 110 may identify an uplink SINR ($\Gamma_{i,m}$) based on the received uplink reference signal.

In operation 620, the base station 110 may identify a modulation and coding scheme (MCS). The base station 110 may compensate for the identified uplink SINR ($\Gamma_{i,m}$) based on whether the link direction of the neighboring base station 120 and the received uplink data have been successfully decoded (i.e., whether the response to be transmitted to the terminal 100 is ACK or NACK). This process may also be referred to as open loop link adaptation (OLLA) or outer loop rate control (OLRC).

Specifically, the base station 110 may update an offset factor $$\theta_i^D$$

or $$\theta_i^U,$$

based on the link direction of the neighboring base station 120 in the slot (t₃) in which the uplink data is transmitted, and the response to the uplink data. Here, $$\theta_i^D$$

may be used to compensate for the uplink SINR ($\Gamma_{i,m}$) when the link direction of the neighboring base station 120 is downlink in the next uplink scheduling, and $$\theta_i^U$$

may be used to compensate for uplink SINR ($\Gamma_{i,m}$) when the link direction of the neighboring base station 120 is uplink in the next uplink scheduling.

For example, in case that the link direction of the neighboring base station 120 is downlink in the slot (t₃) in which uplink data is transmitted, the base station 110 may add $\theta_{up}$ to $$\theta_i^D$$

when the response to the uplink data is ACK, and may subtract $\theta_{down}$ from $$\theta_i^D$$

when the response to the uplink data is NACK. Expressing this mathematically, it is as follows:

$$\begin{cases} \theta_i^D = \theta_i^D + \theta_{up} \text{ when response is } ACK \\ \theta_i^D = \theta_i^D - \theta_{down} \text{ when response is } NACK \end{cases} \quad \text{[Equation 8]}$$

For example, in case that the link direction of the neighboring base station 120 is uplink in the slot (t₃) in which uplink data is transmitted, the base station 110 may add $\theta_{up}$ to $$\theta_i^U$$

when the response to the uplink data is ACK, and may subtract $\theta_{down}$ down from $$\theta_i^U$$

when the response to the uplink data is NACK. Expressing this mathematically, it is as follows:

$$\begin{cases} \theta_i^U = \theta_i^U + \theta_{up} \text{ when response is } ACK \\ \theta_i^U = \theta_i^U - \theta_{down} \text{ when response is } NACK \end{cases} \quad \text{[Equation 9]}$$

Here, $\theta_{up}$ and $\theta_{down}$ may be predefined values for link adaptation, based on a response to downlink data.

The base station 110 may obtain a compensated uplink SINR ($\Gamma_{i,eff}$), based on the link direction of the neighboring base station 120 in the slot (t₄) in which the next uplink data is to be transmitted. When the link direction of the neighboring base station 120 is uplink in slot (t₄), the base station 110 may add the offset factor $$\theta_i^U$$

to the uplink SINR ($\Gamma_{i,m}$) to obtain a compensated uplink SINR ($\Gamma_{i,eff}$). When the link direction of the neighboring base station 120 is downlink in slot (t₄), the base station 110 may add the offset factor $$\theta_i^D$$

to the uplink SINR ($\Gamma_{i,m}$) to obtain a compensated uplink SINR ($\Gamma_{i,eff}$). Expressing this mathematically, it is as follows:

$$\begin{cases} \Gamma_{i,eff} = \Gamma_{i,m} + \theta_i^U \text{ in case of uplink in slot } (t4) \\ \Gamma_{i,eff} = \Gamma_{i,m} - \theta_i^D \text{ in case of downlink in slot } (t4) \end{cases} \quad \text{[Equation 10]}$$

The base station 110 may identify an MCS for downlink data transmission, based on the obtained SINR $$(\Gamma_{i,eff}).$$

This may be referred to as inner loop link adaptation (ILLA) or closed loop rate control (CLRC).

In operation 630, the base station 110 may transmit the identified MCS to a terminal. The base station 110 may transmit the identified MCS to the terminal on a physical downlink control channel (PDCCH) by using downlink control information (DCI) format 1_0 or 1_1. The MCS may be applied in a slot (t₄) in which the next up data is to be transmitted.

Operations according to an embodiment of the disclosure are based on the premise that the base station 110 of the serving cell and the base station 120 of the neighboring cell periodically exchange link direction information. For example, the base station 110 of the serving cell and the base station 120 of the neighboring cell may exchange scheduling information by using at least one of an Xn interface, an X2 interface, an F1 interface, and an E1 interface. The scheduling information may include a downlink (DL)-uplink (UL) transmission period, the number of downlink slots, the number of uplink slots, the number of downlink symbols, the number of uplink symbols, or a combination thereof. The DL-UL transmission period may be the time during which the DL-UL transmission pattern is repeated. The number of downlink slots may be the number of consecutive DL slots in a DL-UL transmission pattern. The number of uplink slots may be the number of consecutive UL slots in a DL-UL transmission pattern. The number of downlink symbols may be the number of consecutive DL symbols in the last slot among consecutive DL slots in the DL-UL transmission pattern. The number of uplink symbols may be the number of consecutive UL symbols in the first slot among consecutive UL slots in the DL-UL transmission pattern.

Figure 7:
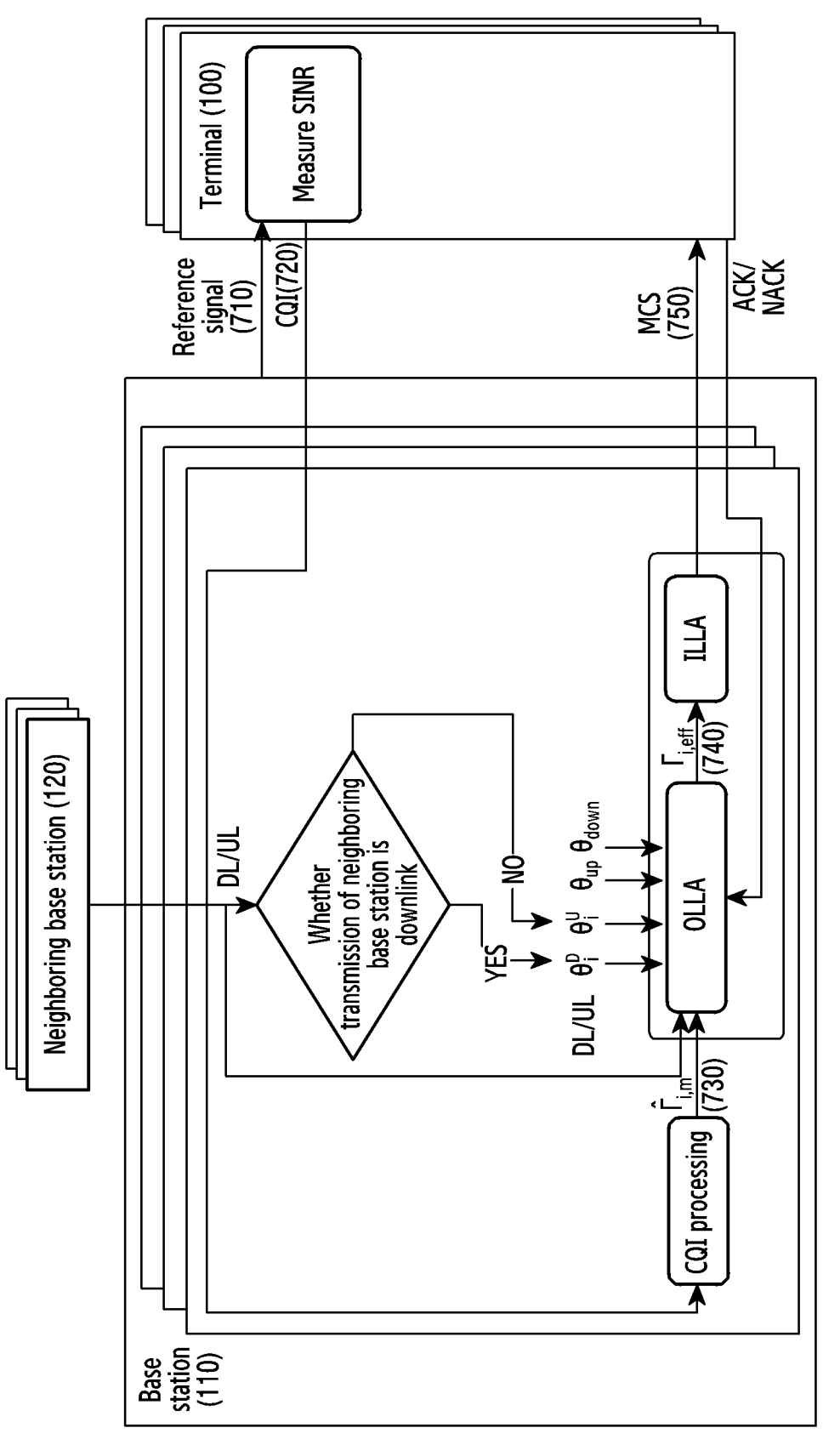
FIG. 7 illustrates an operation flow of a base station for link adaptation in downlink according to an embodiment of the disclosure.

FIG. 7 illustrates an operation flow of a base station for link adaptation in downlink according to an embodiment of the disclosure.

In operation 710, the base station 110 may transmit a downlink reference signal to the terminal 100. For example, the downlink reference signal may include a channel state information-reference signal (CSI-RS), channel state information-interference measurement (CSI-IM), or a combination thereof.

In operation 720, the base station 110 may receive channel state information from the terminal 100. For example, the channel state information may include a rank indicator (RI), a precoding matrix indicator (PMI), a channel quality indicator (CQI), a layer indicator (LI), an SS/PBCH block resource indicator (SSBRI), a CSI resource indicator (CRI), or a combination thereof.

In operation 730, the base station 110 may identify the downlink SINR ($\hat{\Gamma}_{i,m}$)based on the received channel state information (e.g., a CQI).

In operation 740, the base station 110 may identify a compensated downlink SINR ($\Gamma_{i,eff}$). Specifically, the base station 110 may transmit downlink data to the terminal 100 in slot (t₁). The base station 110 may receive a response to the transmitted downlink data from the terminal 100. The response to the downlink data may be ACK or NACK. Here, the base station 110 may update an offset $$\theta_i^D$$

or $$\theta_i^U,$$

based on the link direction of the neighboring base station 120 in the slot (t₁) in which the downlink data is transmitted, and the response to the downlink data.

$$\theta_i^D$$

may be used to compensate for the downlink SINR ($\hat{\Gamma}_{i,m}$) when the link direction of the neighboring base station 120 is downlink in the next downlink scheduling, and $$\theta_i^U$$

may be used to compensate for downlink SINR ($\hat{\Gamma}_{i,m}$) when the link direction of the neighboring base station 120 is uplink in the next downlink scheduling. For example, in case that the link direction of the neighboring base station 120 is downlink in the slot (t₁) in which downlink data is transmitted, the base station 110 may add $\theta_{up}$ to $$\theta_i^D$$

16 when the response to the downlink data is ACK, and may subtract $\theta_{down}$ from $$\theta_i^D$$

when the response to the downlink data is NACK. Expressing this mathematically, it is as follows:

$$\begin{cases} \theta_i^D = \theta_i^D + \theta_{up} & \text{when response is } ACK \\ \theta_i^D = \theta_i^D - \theta_{down} & \text{when response is } NACK \end{cases} \quad \text{[Equation 11]}$$

In addition, in case that the link direction of the neighboring base station 120 is uplink in the slot (t₁) in which downlink data is transmitted, the base station 110 may add $\theta_{up}$ to $$\theta_i^U$$

when the response to the downlink data is ACK, and may subtract $\theta_{down}$ from $$\theta_i^U$$

when the response to the downlink data is NACK. Expressing this mathematically, it is as follows:

$$\begin{cases} \theta_i^U = \theta_i^U + \theta_{up} & \text{when response is } ACK \\ \theta_i^U = \theta_i^U - \theta_{down} & \text{when response is } NACK \end{cases} \quad \text{[Equation 12]}$$

Here, $\theta_{up}$ and $\theta_{down}$ may be predefined values for link adaptation, based on a response to downlink data.

The base station 110 may obtain a compensated downlink SINR ($\Gamma_{i,eff}$), based on the link direction of the neighboring base station 120 in the slot (t₂) in which the next downlink data is to be transmitted. When the link direction of the neighboring base station 120 is uplink in slot (t₂), the base station 110 may add the offset factor $$\theta_i^U$$

to the downlink SINR ($\hat{\Gamma}_{i,m}$) to obtain a compensated downlink SINR ($\Gamma_{i,eff}$). When the link direction of the neighboring base station 120 is downlink in slot (t₂), the base station 110 may add the offset factor $$\theta_i^D$$

to the downlink SINR ($\hat{\Gamma}_{i,m}$) to obtain a compensated downlink SINR ($\Gamma_{i,eff}$). Expressing this mathematically, it is as follows:

$$\begin{cases} \Gamma_{i,eff} = \hat{\Gamma}_{i,m} + \theta_i^U & \text{in case of uplink in slot } (t2) \\ \Gamma_{i,eff} = \hat{\Gamma}_{i,m} - \theta_i^D & \text{in case of downlink in slot } (t2) \end{cases} \quad \text{[Equation 13]}$$

The process in operation 740 may also be referred to as inner loop link adaptation (ILLA) or closed loop rate control (CLRC).

In operation 750, the base station 110 may transmit a modulation and coding scheme (MCS) to the terminal 100. The base station 110 may identify the MCS, based on the obtained SINR ($\Gamma_{i,eff}$). This process may also be referred to as inner loop link adaptation (ILLA) or closed loop rate control (CLRC). The base station 110 may transmit the identified MCS to the terminal 100 on a physical downlink control channel (PDCCH) by using downlink control information (DCI) format 1_0 or 1_1.

Operations according to an embodiment of the disclosure are based on the premise that the base station 110 of the serving cell and the base station 120 of the neighboring cell periodically exchange link direction information. For example, the base station 110 of the serving cell and the base station 120 of the neighboring cell may exchange scheduling information by using at least one of an Xn interface, an X2 interface, an F1 interface, and an E1 interface. The scheduling information may include a downlink (DL)-uplink (UL) transmission period, the number of downlink slots, the number of uplink slots, the number of downlink symbols, the number of uplink symbols, or a combination thereof. The DL-UL transmission period may be the time during which the DL-UL transmission pattern is repeated. The number of downlink slots may be the number of consecutive DL slots in a DL-UL transmission pattern. The number of uplink slots may be the number of consecutive UL slots in a DL-UL transmission pattern. The number of downlink symbols may be the number of consecutive DL symbols in the last slot among consecutive DL slots in the DL-UL transmission pattern. The number of uplink symbols may be the number of consecutive UL symbols in the first slot among consecutive UL slots in the DL-UL transmission pattern.

Figure 8:
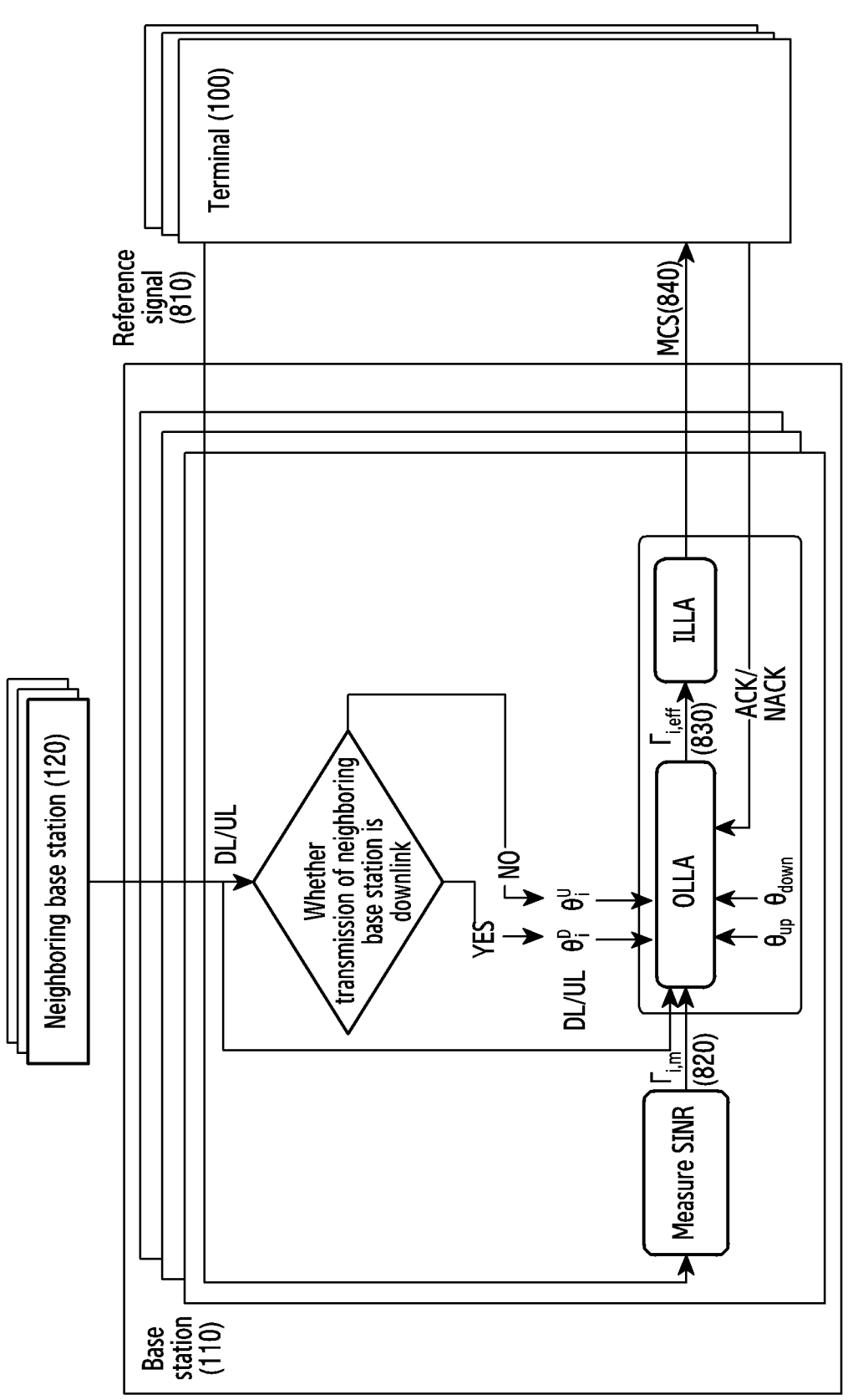
FIG. 8 illustrates an operation flow of a base station for link adaptation in uplink according to an embodiment of the disclosure.

FIG. 8 illustrates an operation flow of a base station for link adaptation in uplink according to an embodiment of the disclosure.

In operation 810, the base station 110 may receive an uplink reference signal from a terminal. For example, the uplink reference signal may be a sounding reference signal (SRS).

In operation 820, the base station 110 may identify an uplink SINR ($\Gamma_{i,m}$) based on the received uplink reference signal.

In operation 830, the base station 110 may identify a compensated uplink SINR ($\Gamma_{i,eff}$). Specifically, the base station 110 may receive uplink data from the terminal 100 in slot ($t_3$). The base station 110 may update an offset factor $$\theta_i^D$$

or $$\theta_i^U,$$

based on the link direction of the neighboring base station 120 in the slot ($t_3$) in which the uplink data is transmitted, and the response to the uplink data. Here, $$\theta_i^D$$

may be used to compensate for the uplink SINR ($\Gamma_{i,m}$) when the link direction of the neighboring base station 120 is downlink in the next uplink scheduling, and $$\theta_i^U$$

may be used to compensate for uplink SINR ($\Gamma_{i,m}$) when the link direction of the neighboring base station 120 is uplink in the next uplink scheduling. For example, in case that the link direction of the neighboring base station 120 is downlink in the slot ($t_3$) in which uplink data is transmitted, the base station 110 may add $\theta_{up}$ to $$\theta_i^D$$

when the response to the uplink data is ACK, and may subtract $\theta^{down}$ from $$\theta_i^D$$

when the response to the uplink data is NACK. Expressing this mathematically, it is as follows:

$$\begin{cases} \theta_i^D = \theta_i^D + \theta_{up} & \text{when response is } ACK \\ \theta_i^D = \theta_i^D - \theta_{down} & \text{when response is } NACK \end{cases} \quad \text{[Equation 14]}$$

For example, in case that the link direction of the neighboring base station 120 is uplink in the slot ($t_3$) in which uplink data is transmitted, the base station 110 may add $\theta_{up}$ to $$\theta_i^U$$

when the response to the uplink data is ACK, and may subtract $\theta_{down}$ from $$\theta_i^U$$

the response to the uplink data is NACK. Expressing this mathematically, it is as follows:

$$\begin{cases} \theta_i^U = \theta_i^U + \theta_{up} & \text{when response is } ACK \\ \theta_i^U = \theta_i^U - \theta_{down} & \text{when response is } NACK \end{cases} \quad \text{[Equation 15]}$$

Here, $\theta_{up}$ and $\theta_{down}$ may be predefined values for link adaptation, based on a response to downlink data.

The base station 110 may obtain a compensated uplink SINR ($\Gamma_{i,eff}$), based on the link direction of the neighboring base station 120 in the slot ($t_4$) in which the next uplink data is to be transmitted. When the link direction of the neighboring base station 120 is uplink in slot ($t_4$), the base station 110 may add the offset factor $$\theta_i^U$$

to the uplink SINR ($\Gamma_{i,m}$) to obtain a compensated uplink SINR ($\Gamma_{i,eff}$). When the link direction of the neighboring base station 120 is downlink in slot ($t_4$), the base station 110 may add the offset factor $$\theta_i^D$$

to the uplink SINR ($\Gamma_{i,m}$) to obtain a compensated uplink SINR ($\Gamma_{i,eff}$). Expressing this mathematically, it is as follows:

$$\begin{cases} \Gamma_{i,eff} = \Gamma_{i,m} + \theta_i^U & \text{in case of uplink in slot } (t4) \\ \Gamma_{i,eff} = \Gamma_{i,m} - \theta_i^D & \text{in case of downlink in slot } (t4) \end{cases} \quad [\text{Equation 16}]$$

The process in operation 830 may also be referred to as outer loop link adaption (OLLA) or outer loop rate control (OLRC).

In operation 840, the base station 110 may transmit a modulation and coding scheme (MCS) to the terminal 100. The base station 110 may identify the MCS, based on the obtained SINR ($\Gamma_{i,eff}$). This process may also be referred to as inner loop link adaptation (ILLA) or closed loop rate control (CLRC). The base station 110 may transmit the identified MCS to the terminal 100 on a physical downlink control channel (PDCCH) by using a downlink control information (DCI) format 1-0 or 1-1.

Operations according to an embodiment of the disclosure are based on the premise that the base station 110 of the serving cell and the base station 120 of the neighboring cell periodically exchange link direction information. For example, the base station 110 of the serving cell and the base station 120 of the neighboring cell may exchange scheduling information by using at least one of an Xn interface, an X2 interface, an F1 interface, and an E1 interface. The scheduling information may include a downlink (DL)-uplink (UL) transmission period, the number of downlink slots, the number of uplink slots, the number of downlink symbols, the number of uplink symbols, or a combination thereof. The DL-UL transmission period may be the time during which the DL-UL transmission pattern is repeated. The number of downlink slots may be the number of consecutive DL slots in a DL-UL transmission pattern. The number of uplink slots may be the number of consecutive UL slots in a DL-UL transmission pattern. The number of downlink symbols may be the number of consecutive DL symbols in the last slot among consecutive DL slots in the DL-UL transmission pattern. The number of uplink symbols may be the number of consecutive UL symbols in the first slot among consecutive UL slots in the DL-UL transmission pattern.

FIGS. 1 to 8, a technique for adapting uplink or downlink according to the link direction of a neighboring cell has been described. In an existing time division duplex (TDD) system, since all cells simultaneously use uplink or downlink, there has been no need to consider the link direction of a neighboring cell even though the strength of interference power between a neighboring base station and a neighboring terminal is different. However, since the link direction is different by each cell in the dynamic TDD system, the link direction of neighboring cells needs to be considered to maintain a data transmission rate. Therefore, in various embodiments of the disclosure, the base station may allocate a modulation and coding scheme (MCS) to the terminal according to the link direction of the neighboring cell to reduce the difference between the channel state at the time of actual data transmission and the channel state which has become the standard for MCS allocation, thereby preventing performance deterioration.

The method performed by a first base station according to an embodiment of the disclosure as described above may include identifying a first signal-to-interference-noise ratio (SINR), based on channel state information received from a terminal, identifying a modulation and coding scheme (MCS), based on the first SINR and information on a link direction of a second base station, and transmitting information indicating the MCS to the terminal.

According to an embodiment, the information on the link direction of the second base station may include information on a first link direction of the second base station in a first slot and information on a second link direction of the second base station in a second slot.

According to an embodiment, the identifying of the first SINR may include transmitting a downlink reference signal to the terminal, and the channel state information may be determined based on the downlink reference signal.

According to an embodiment, the method may further include transmitting downlink data to the terminal in the first slot, receiving a response to the downlink data from the terminal, and determining an offset factor, based on the response from the terminal and the first link direction of the second base station in the first slot.

According to an embodiment, the method may further include identifying a second SINR from the first SINR, based on the offset factor and the second link direction of the second base station in the second slot, and identifying the MCS, based on the second SINR.

The method performed by a first base station according to an embodiment of the disclosure as described above may include identifying a first signal-to-interference-noise ratio (SINR), based on an uplink reference signal received from a terminal, identifying a modulation and coding scheme (MCS), based on the first SINR and information on a link direction of a second base station, and transmitting information indicating the MCS to the terminal.

According to an embodiment, the information on the link direction of the second base station may include information on a first link direction of the second base station in a first slot and information on a second link direction of the second base station in a second slot.

According to an embodiment, the method may further include receiving uplink data from the terminal in the first slot, decoding the received uplink data, and determining an offset factor, based on a response to the uplink data based on the decoding, and the first link direction of the second base station in the first slot.

According to an embodiment, the method may further include identifying a second SINR from the first SINR, based on the offset factor and the second link direction of the second base station in the second slot, and identifying the MCS, based on the second SINR.

According to an embodiment, the uplink reference signal may be a sounding reference signal (SRS).

The first base station according to an embodiment of the disclosure as described above may include at least one transceiver, and at least one processor operatively connected to the at least one transceiver, wherein the at least one processor may be configured to identify a first signal-to-interference-noise ratio (SINR), based on channel state information received from a terminal, identify a modulation and coding scheme (MCS), based on information on the first SINR and a link direction of a second base station, and transmit information indicating the MCS to the terminal.

According to an embodiment, the information on the link direction of the second base station may include information on a first link direction of the second base station in a first slot and information on a second link direction of the second base station in a second slot.

According to an embodiment, the at least one processor may be further configured to transmit a downlink reference signal to the terminal, and the channel state information may be determined based on the downlink reference signal.

According to an embodiment, the at least one processor may be further configured to transmit downlink data to the terminal in the first slot, receive a response to the downlink data from the terminal, and determine an offset factor, based on the response from the terminal and the first link direction of the second base station in the first slot.

According to an embodiment, the at least one processor may be further configured to identify a second SINR from the first SINR, based on the offset factor and the second link direction of the second base station in the second slot, and identify the MCS, based on the second SINR.

The first base station according to an embodiment of the disclosure as described above may include at least one transceiver, and at least one processor operatively connected to the at least one transceiver, wherein the at least one processor may be configured to identify a first signal-to-interference-noise ratio (SINR), based on an uplink reference signal received from a terminal, identify a modulation and coding scheme (MCS), based on the first SINR and information on a link direction of a second base station, and transmit information indicating the MCS to the terminal.

According to an embodiment, the information on the link direction of the second base station may include information on a first link direction of the second base station in a first slot and information on a second link direction of the second base station in a second slot.

According to an embodiment, the at least one processor may be further configured to receive uplink data from the terminal in the first slot, decode the received uplink data, and determine an offset factor, based on a response to the uplink data based on the decoding, and the first link direction of the second base station in the first slot.

According to an embodiment, the at least one processor may be further configured to identify a second SINR from the first SINR, based on the offset factor and the second link direction of the second base station in the second slot, and identify the MCS, based on the second SINR.

According to an embodiment, the uplink reference signal may be a sounding reference signal (SRS).

The methods according to embodiments described in the claims or the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure.

What is claimed is:

1. A method performed by a first base station in a wireless communication system, the method comprising:
   identifying a first signal-to-interference-noise ratio (SINR), based on channel state information received from a terminal;
   transmitting, to the terminal, downlink data in a first slot;
   receiving, from the terminal, a response to the downlink data;
   determining an offset factor based on the response and a first link direction of a second base station in the first slot;
   identifying a second SINR from the first SINR, based on the offset factor and a second link direction of the second base station in a second slot;
   identifying a modulation and coding scheme (MCS), based on the second SINR; and
   transmitting information indicating the MCS to the terminal.

2. The method of claim 1, wherein the identifying the first SINR comprises transmitting a downlink reference signal to the terminal, and
   wherein the channel state information is based on the downlink reference signal.

3. A method performed by a first base station in a wireless communication system, the method comprising:

identifying a first signal-to-interference-noise ratio (SINR), based on an uplink reference signal received from a terminal;

receiving, from the terminal, uplink data in a first slot;

decoding the uplink data;

determining an offset factor, based on a response to the uplink data based on the decoding, and a first link direction of a second base station in the first slot;

identifying a second SINR from the first SINR, based on the offset factor and a second link direction of the second base station in a second slot;

identifying a modulation and coding scheme (MCS), based on the second SINR; and transmitting information indicating the MCS to the terminal.

4. The method of claim 3, wherein the uplink reference signal is a sounding reference signal (SRS).

5. A first base station in a wireless communication system, the first base station comprising:

at least one transceiver; and at least one processor operatively connected to the at least one transceiver, wherein the at least one processor is configured to:

identify a first signal-to-interference-noise ratio (SINR), based on channel state information received from a terminal, transmit, to the terminal, downlink data in a first slot, receive, from the terminal, a response to the downlink data, identify an offset factor based on the response and a first link direction of a second base station in the first slot, identify a second SINR from the first SINR, based on the offset factor and a second link direction of the second base station in a second slot, identify a modulation and coding scheme (MCS), based on the second SINR; and transmit information indicating the MCS to the terminal.

6. The first base station of claim 5, wherein the at least one processor is further configured to transmit a downlink reference signal to the terminal, and wherein the channel state information is based on the downlink reference signal.

* * * * *